Figure 6:
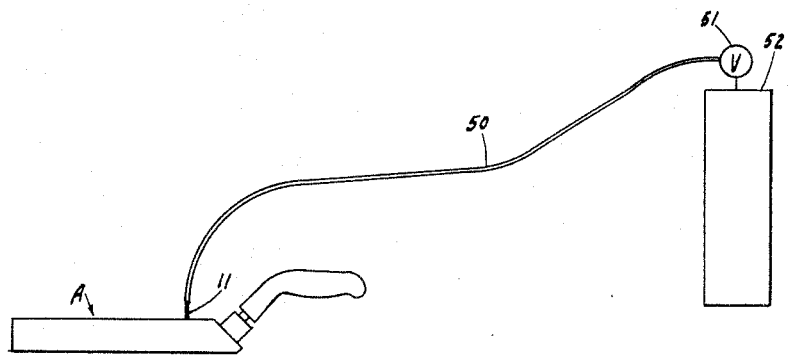

Oct. 20, 1953   R. H. FIRMINHAC   2,656,476
SURVEY INSTRUMENT
Filed Feb. 1, 1950                                 2 Sheets-Sheet 1
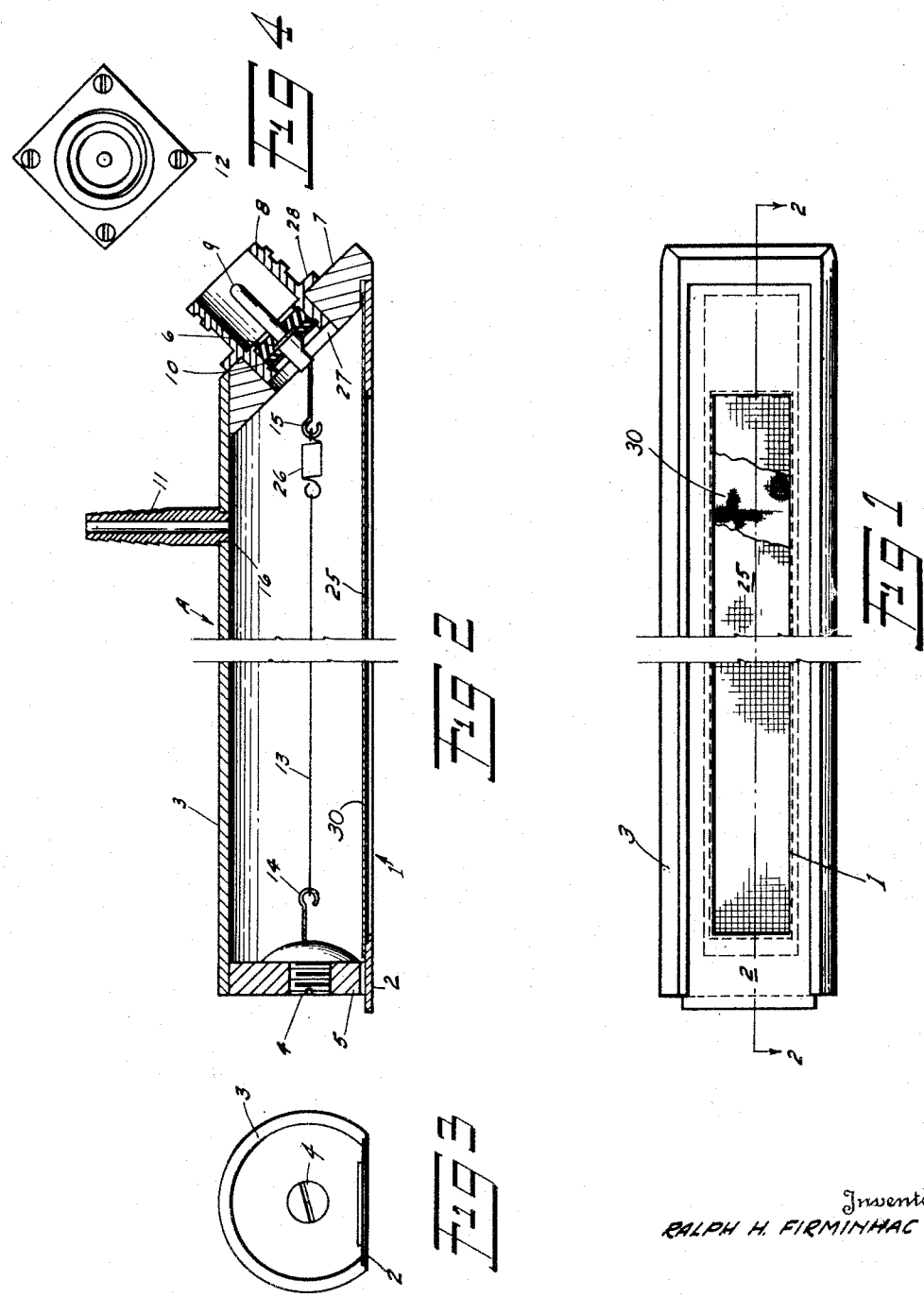
Inventor
RALPH H. FIRMINHAC
By Roland A. Anderson
Attorney Oct. 20, 1953   R. H. FIRMINHAC   2,656,476
SURVEY INSTRUMENT Filed Feb. 1, 1950   2 Sheets-Sheet 2

Inventor
RALPH H. FIRMINHAC

By Roland A. Anderson
Attorney

Patented Oct. 20, 1953

2,656,476

UNITED STATES PATENT OFFICE 2,656,476

SURVEY INSTRUMENT

Ralph H. Firminhac, Oak Ridge, Tenn., assignor to the United States of America as represented by the United States Atomic Energy Commission Application February 1, 1950, Serial No. 141,743

1 Claim. (Cl. 313—93)

My invention relates to radiation detection and survey instruments, and more particularly to an ionizing chamber adapted for detecting low energy beta particles and secondary electrons, and which is especially well suited for use with a pulse type detecting system.

The present invention is an improvement over such survey instruments as those of the prior copending application of Borkowski, Serial No. 748,433, and of Simpson described in volume 16, page 733 of the Review of Scientific Instruments in an article entitled "Air proportional counters."

In the prior art it had been the practice to survey areas or points of contamination with direct current ion chamber instruments. However, because of their relatively low sensitivity many low energy electrons and beta particles would not be detected in a survey, so that the intensity of radiation indicated was frequently too low. Proportional pulse type survey instruments, which tend to provide a greater sensitivity, making possible the detection of lower levels of activity, are easier to maintain than ionization chamber types, and make possible the use of an audio signal output.

Gas amplification in a proportional counter is, over wide regions, approximately an exponential function of the voltage across the counter. For low voltages such as are preferred in survey instruments for radiation detection, the gas multiplication is not exponential, but appears to be a different function of voltage for each different gas filling mixture. At desired operating voltages, gas multiplication in air changes so rapidly with voltage that the counter is difficult to operate, while in polyatomic gases at the same voltage, the gas amplification changes much more slowly with voltage. Provided sufficient gas amplification is employed to meet the voltage gain requirements of a detector system, it is apparent that use of a polyatomic gas would render a counter much less sensitive to voltage variations than are present in air type counters. A very thin membrane must be used for the window of a counter if low energy beta particles and electrons are to be measured. Because of the low strength of such membranes, the pressure difference across the membrane must be small. In the case where air is used as the filling gas, the problem is solved by using air at atmospheric pressure in the chamber. When other gases are used, diffusion and leakage contaminates the mixture, changing the counter characteristics and minimizing any advantages of using polyatomic gas filling. If, however, the polyatomic gas is maintained at a small positive pressure, leakage will be principally outward, flushing out any air as rapidly as it enters.

Applicant with a knowledge of all of these problems in the prior art has for an object of his invention the provision of a probe for use as a proportional counter having an ionization chamber with a gas maintained at a substantially uniform pressure.

Applicant has as another object of his invention the provision of a survey instrument for use in a radiation detection system and utilized to detect the contamination due to soft beta emitters, such as $C^{14}$ and $S^{35}$.

Applicant has as a further object of his invention the provision of a radiation detecting system having a gas fed probe with a membrane covered window to provide a survey instrument maintained under substantially constant gas pressure for exhibiting relatively uniform characteristics.

Other objects and advantages of my invention will appear from the following specification and the accompanying drawings, and the novel features thereof will be particularly pointed out in the annexed claim.

Figure 5:
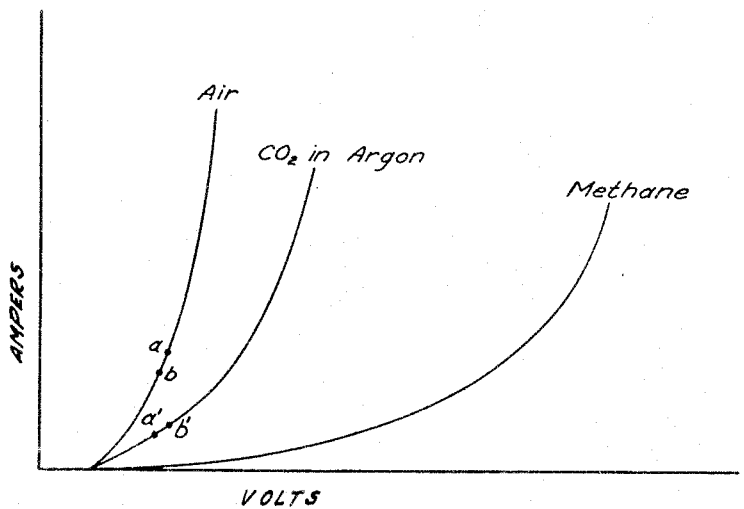

In the drawings, Fig. 1 is a lower plan view of my improved probe for use in a radiation detecting system. For 2 is a longitudinal sectional elevation of my improved probe taken along the line 2—2 of Fig. 1. Fig. 3 is an end elevation of the same probe. Fig. 4 is a detail of the connector for joining the probe to the detecting system. Fig. 5 is a group of characteristic curves providing a comparison between the action of air and other gases or mixtures in a survey instrument. Fig. 6 is a schematic of the probe and the system for supplying gas thereto.

The sensitivity of conventional thin window counters is very poor because of the small penetrating power of low-energy beta particles and electrons. Hence, a probe type instrument is convenient to bring the detector component very close to the radiation source, in order to survey possible surfaces, corners and recesses where contamination might exist.

The pulse type survey instrument, such as disclosed in Borkowski, supra, was designed to survey surfaces contaminated with alpha, beta and gamma emitters. The probe type ionization chamber preferably has a window of nylon film of about .0002 inch in thickness through which the radiations enter. The ionization current caused to flow inside the chamber is a measure of the contamination on the surface or place surveyed.

In an air proportional counter, the gas amplification changes rapidly with the voltage impressed on the chamber. The voltage causing a continuous discharge in air is very little higher than the voltage necessary for such amplification to count soft beta radiation.

However, certain of the available gases have slower changing voltage gas amplification characteristics, and are more suitable for beta counting than air. For example, a three percent by volume mixture of carbon dioxide in argon operates with the desired characteristics in the same voltage range as the air filled probes of the prior art, heretofore referred to. Methane, and an admixture of hydrocarbons in nitrogen and several other gases also have acceptable amplification characteirstics. However, methane, with its flatter curve, it not so desirable since it tends to require excessively high potentials to provide sufficient amplification.

In the present improvement, means is provided for connecting the probe to a bottle or drum of gas which is under pressure. Gases are permitted to flow slowly into the probe and to diffuse through the membrane thereon. This constant flow of gas maintains the voltage-amplification of the probe at an essentially constant value.

With gas flowing through the probe, it is sensitive to alpha, beta, and gamma radiation. Both fine and course adjustment potentiometers in the power supply may be provided for setting up the proper chamber voltage. At some voltage, only the pulses due to alpha particles would be counted. At another, higher voltage, provided by a different position of the potentiometer, pulses due to beta plus alpha radiation would be counted.

Referring to the drawings in detail, A generally designates a probe having an outer shell 3 and being of partially circular configuration with cut away walls at the flat portion which may be grooved to receive a slide 2. Slide 2 has therein an open elongated window portion 1 covered by a screen mesh 25 secured integrally in a recess provided therefor, preferably in the inner face of the slide. Mounted also on the inner face of the slide 2 and over screen mesh 25 and secured thereto through cement or other adhesive, such as rubber cement, is a thin film of plastic, such as nylon or rubber hydrochloride of about .0002 inch thickness providing a membrane 30. While this is the preferred form of the invention it will be apparent that the screen and film may be secured to opposite faces of the slide without impairing the operation of the probe or survey instrument. The slide 2 is preferably of soft metal such as brass, copper or aluminum and is adapted to co-act through its edges with grooves formed in the lower face of the shell 3. Secured within the shell at each extremity and completing the closure are ends 5, 7. The end 5 is preferably disposed perpendicularly to the shell while the end 7 seats angularly therein to provide a bevelled rear edge. Mounted in the screw threaded bore in the end 5 is a polystyrene screw 4 having threads which co-act with the bore of the end 5, and a head which is adapted to abut the innerface of said end. A groove in the opposite end of the screw is provided to receive and co-act with a tool, such as a screwdriver, for adjusting or removing the screw 4. Extending inwardly from the head of screw 4 is an extension which terminates in a ring or hook 14. This ring 14 is adapted to receive and anchor the end of the center wire 13 of the probe. The connection may simply be accomplished by winding or binding the wire end about the hook and twisting it upon itself, or solder or other more permanent means may be employed for the purpose. At the opposite end of the probe and disposed within a bore in end 7 is a conventional concentric connector having an outer conducting shell 8 and an inner conducting pin 9 separated by insulating retaining washers 6, 10 disposed within the shell 8 and extending about the pin 9. The lower end of the pin 9 is soldered or otherwise secured to a hook 15 which carries and interlocks with one end of a tension spring 26 while the other end thereof is soldered or otherwise secured to an end of the conducting center wire 13. The spring wire 26 insures that the center conductor 13 is maintained taut and prevented from substantial movement toward the outer shell 3. The connector has a reduced portion adjacent one end which is positioned in bore 27 of end 7 and is maintained therein by screws 12, which pass through the abutting flange 28 adjacent the corners and seat in screw threaded sockets in end 7. This connector also has a screw threaded surface on tubular portion 8 which is adapted to co-act with another portion of the plug (not shown) that carries an internally screw threaded cap for joining the probe through an appropriate cable to the detecting system.

An opening 16 is formed in the upper wall of shell 3 of the probe for the reception of the reduced end of a serrated nipple 11. The nipple may be secured in place either by co-acting with screw threads in the walls of the opening 16 in the shell or it may be made integral with the shell by soldering or otherwise. This nipple serves to conduct gas into the chamber defined by the shell 3 and seats in the end of hose 50 leading to a needle valve or other valve 51 mounted on a tank or container 52, as indicated in Fig. 6.

In its operation, the needle valve 51 is opened permitting the flow of the selected proportional gas from container 52 through line or hose 50 to the probe A. If the slide 2 is positioned in the shell 3, the pressure will begin to build up with the flow of gas through the nipple 11 into the probe. This forces the air and some of the gas out of the probe at the point of connection of the slide to the casing. In addition, some of the gas will slowly diffuse through the membrane 30. With an approximate voltage setting for the probe, the operator will proceed to move it about, surveying the surfaces or other places under exploration. Since the needle valve 51 is adjusted to provide substantially constant conditions within the probe so that the gases which are lost through the membrane 30 and around the edges of the slide are replenished, the voltages on the probe may be set and leakage maintained during the survey operations, thereby eliminating the requirement for careful voltage adjustment which was necessary in the prior art by reason of the leakage and loss of the gases from the ionization chamber.

While, as heretofore indicated, it would be desirable to select a gas such as methane which has a substantially flat characteristic, as shown in Fig. 5, the high potentials necessary make its use undesirable in such a system. On the other hand, as will be indicated by points $a$ and $b$ on the characteristic curves for air in Fig. 5, the amplification required at point $a$ is difficult to obtain on this steep curve for soft beta detection, without reaching point $b$ which would result in continuous discharge. However, the characteristic curve for three percent carbon dioxide in argon is not nearly so steep as air so that at point $a'$, the amplification necessary for soft beta detection, may be reached without danger of extending the operation of the system to point $b'$ where continuous discharge may result. At the same time extremely high potentials for the probe are obviated.

Having thus described my invention, I claim:

A survey instrument for use with polyatomic gases comprising an elongated hollow metallic casing, said casing having a slide with a window therein for the passage of radiations, a conductor disposed within and extending axially of the casing, said conductor being insulated from the casing, a nipple for continuously feeding a polyatomic gas to the casing, a thin plastic film of substantially .0002 inches in thickness carried by the slide and covering the window for limiting the egress of gas from the casing, and a shield extending across said window to resist the ingress of contamination.

RALPH H. FIRMINHAC.

References Cited in the file of this patent

UNITED STATES PATENTS

| Number | Name | Date |
|---|---|---|
| 2,465,821 | Smoluchowski | Mar. 29, 1949 |
| 2,479,600 | Borkowski | Aug. 23, 1949 |
| 2,502,331 | Malter | Mar. 28, 1950 |
| 2,505,919 | Simpson, Jr. | May 2, 1950 |

OTHER REFERENCES

"A Methane Flow Beta-Proportional Counter," Bernstein et al., The Review of Scientific Instruments, vol. 20, Number 5, May 1949, AECD-2410, June 30, 1945